United States Patent
Murakami

(10) Patent No.: US 11,821,725 B2
(45) Date of Patent: Nov. 21, 2023

(54) FRACTURE SURFACE INSPECTION DEVICE AND FRACTURE SURFACE INSPECTION METHOD FOR LOSS EVALUATION

(71) Applicant: YASUNAGA CORPORATION, Iga (JP)

(72) Inventor: Ryosuke Murakami, Iga (JP)

(73) Assignee: YASUNAGA CORPORATION, Iga (JP)

( * ) Notice: Subject to any disclaimer, the term of this patent is extended or adjusted under 35 U.S.C. 154(b) by 0 days.

(21) Appl. No.: 17/754,610

(22) PCT Filed: Nov. 19, 2020

(86) PCT No.: PCT/JP2020/043110
§ 371 (c)(1),
(2) Date: Apr. 7, 2022

(87) PCT Pub. No.: WO2021/111883
PCT Pub. Date: Jun. 10, 2021

(65) Prior Publication Data
US 2022/0373324 A1    Nov. 24, 2022

(30) Foreign Application Priority Data

Dec. 2, 2019    (JP) .................................. 2019-217865

(51) Int. Cl.
*G01B 11/25* (2006.01)
*G01M 5/00* (2006.01)
*G01M 13/00* (2019.01)

(52) U.S. Cl.
CPC ...... *G01B 11/2527* (2013.01); *G01B 11/2513* (2013.01); *G01M 5/0033* (2013.01); *G01M 5/0091* (2013.01); *G01M 13/00* (2013.01)

(58) Field of Classification Search
None
See application file for complete search history.

(56) References Cited

U.S. PATENT DOCUMENTS

2019/0128663 A1 *   5/2019   Isei .................. G01B 21/02

FOREIGN PATENT DOCUMENTS

| EP | 2711664 A1 * | 3/2014 | ........... G01B 11/026 |
| JP | 2012-73142 A | 4/2012 | |

(Continued)

OTHER PUBLICATIONS

International Search Report and Written Opinion for corresponding International Application No. PCT/JP2020/043110 dated Jan. 12, 2021.

*Primary Examiner* — Michael P LaPage
(74) *Attorney, Agent, or Firm* — Westman, Champlin & Koehler, P.A.

(57) ABSTRACT

A fracture surface inspection device for inspecting a first fracture surface and a second fracture surface that are generated through fracture splitting, which is provided with a data acquisition unit configured to acquire two-dimensional data and three-dimensional data on each of the fracture surfaces, a contour extraction unit configured to extract, from the two-dimensional data, a first contour of the first fracture surface and a second contour of the second fracture surface, a transformation amount calculation unit configured to calculate a transformation amount X(affine) when the second contour is affine-transformed to the first contour, a distortion correction unit configured to calculate distortion correction data by affine-transforming the three-dimensional data on the second fracture surface with the transformation amount X(affine), and a comparison unit configured to compare the three-dimensional data on the first fracture surface and the distortion correction data.

19 Claims, 10 Drawing Sheets

(56) References Cited

FOREIGN PATENT DOCUMENTS

| JP | 2016-170624 | A | 9/2016 |
|----|-------------|---|--------|
| JP | 2017-211195 | A | 11/2017 |
| JP | 6591131 | B1 | 10/2019 |

\* cited by examiner

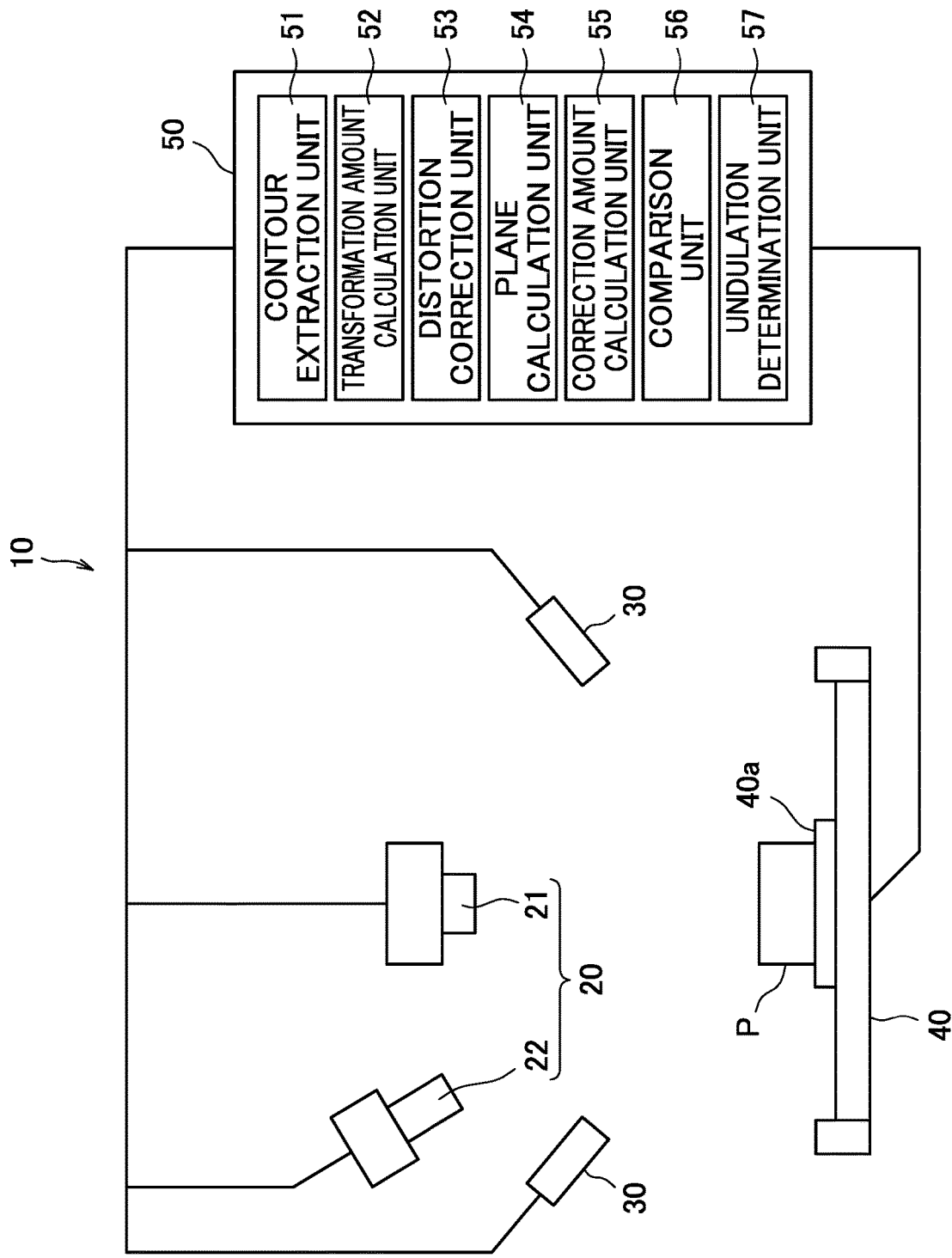

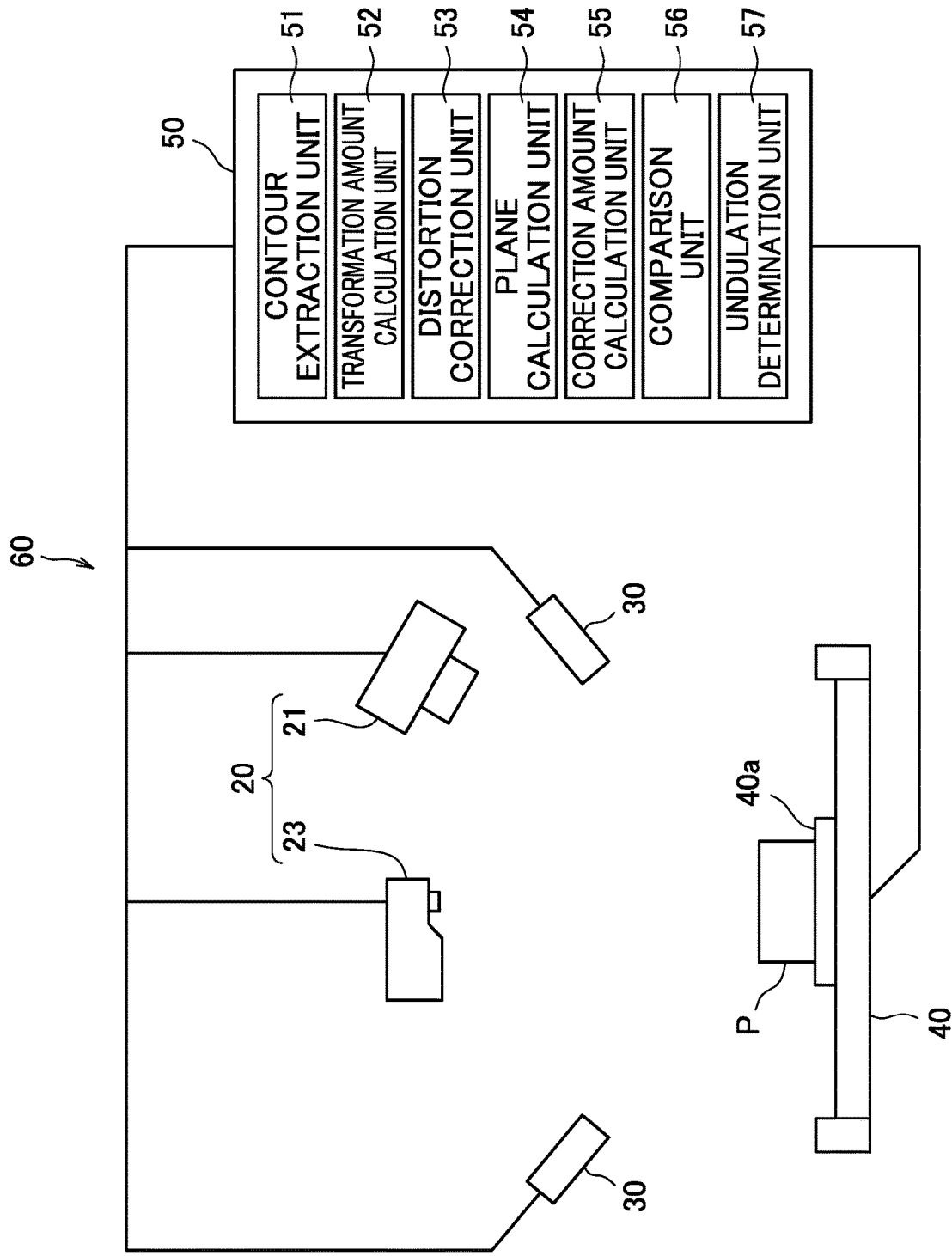

FRACTURE SURFACE INSPECTION DEVICE AND FRACTURE SURFACE INSPECTION METHOD FOR LOSS EVALUATION

CROSS-REFERENCE TO RELATED APPLICATIONS

The present application is a § 371 national phase entry of PCT International patent application Serial No. PCT/JP2020/043110, filed Nov. 19, 2020, and further claims priority to Japanese patent application Ser. No. 2019-217865, filed Dec. 2, 2019.

TECHNICAL FIELD

The present invention relates to a fracture surface inspection device and a fracture surface inspection method.

BACKGROUND ART

A connecting rod used in an engine of an automobile and the like is widely used as a member for connecting a piston and a crankshaft to transform a reciprocating motion of the piston into a rotating motion of the crankshaft. The connecting rod is split (half-split) by fracturing a large end portion thereof into a rod part and a cap part using the so-called FS (Fracture Splitting) method, and then is assembled to the crankshaft and fastened to each other by means of bolting. This makes it possible to use unevenness generated on fracture surfaces of the rod part and the cap part for positioning, thereby allowing low-cost manufacturing.

Here, in the connecting rod formed by the FS method, if a part of the fracture surface is lost when the connecting rod is fractured into the rod part and the cap part, a gap is formed on a connecting surface on which the fracture surfaces of the rod part and the cap part are reconnected, and the strength thereof is deteriorated. To solve such a problem, in the prior arts disclosed in Patent Documents 1 and 2, for example, a fracture surface inspection method is used in which an uneven state of the fracture surface of the connecting rod is measured and a loss generated at the time of fracture is evaluated.

More specifically, the prior art of Patent Document 1 is a method of inspecting a fractured surface online for a production line, in which three-dimensional data on unevenness is acquired by arranging, on a fixing jig, a rod part and a cap part that are fractured and split, irradiating a laser beam on the fracture surfaces thereof, and imaging the projected images from different angles, and then a difference in the height of unevenness from one imaging data is calculated by flipping the imaging data on the other fracture surface vertically and horizontally.

Further, the prior art of Patent Document 2 is a method of inspecting a fracture surface without using a complicated program. In this method, three-dimensional data on unevenness is acquired from focusing control information of a CCD camera that images fracture surfaces of a rod part and a cap part, a reference plane common to the rod part and the cap part is set from among a plurality of feature points set on the contours of the fracture surfaces, and then a distance from the reference plane to the fracture surface is compared between the rod part and the cap part for each measurement point.

PRIOR ART DOCUMENT

Patent Document

Patent Document 1: Japanese Patent Laid-Open No. 2017-211195
Patent Document 2: Japanese Patent Laid-Open No. 2012-73142

SUMMARY OF THE INVENTION

Problems to be Solved by the Invention

However, in each of the above prior arts, when an inclination angle and a distance of the fracture surface with respect to an imaging device are different between the rod part and the cap part, the ratios of the imaged fracture surface to the angle of view of the imaging device is also different therebetween. As a result, measurement accuracy may be deteriorated due to unmatching of coordinates of data points on the two corresponding fracture surfaces. Particularly, in the prior art of Patent Document 1, in the three-dimensional data on the fracture surfaces of the rod part and the cap part measured at the same time, a region of the fracture surface is specified by position coordinates on the plane of the imaging data. As a result, if the coordinates of the fracture surfaces are not matched at the time of data acquisition, all the corresponding data points of the rod part and the cap part will be displaced, and an appropriate fracture surface inspection cannot be performed.

The present invention has been made in view of such a problem, and disclosed embodiments of the present invention provide a fracture surface inspection device and a fracture surface inspection method capable of inspecting a fracture surface of a component at high speed and with high accuracy.

Means for Solving the Problems

An aspect of the present invention is directed to a fracture surface inspection device for inspecting a first fracture surface and a second fracture surface that are generated by fracturing and splitting a component, which includes a data acquisition unit configured to acquire two-dimensional data and three-dimensional data on the first fracture surface and the second fracture surface, a contour extraction unit configured to extract a first contour of the first fracture surface and a second contour of the second fracture surface from the two-dimensional data, a transformation amount calculation unit configured to calculate a transformation amount when the second contour is affine-transformed to the first contour, a distortion correction unit configured to calculate distortion correction data by affine-transforming the three-dimensional data on the second fracture surface with the transformation amount, and a comparison unit configured to compare the three-dimensional data on the first fracture surface and the distortion correction data.

Advantageous Effects of the Invention

According to the present invention, it is possible to inspect a fracture surface of a component at high speed and with high accuracy.

The present summary is provided only by way of example, and not limitation. Other aspects of the present invention will be appreciated in view of the entirety of the present disclosure, including the entire text, claims and accompanying figures.

BRIEF DESCRIPTION OF THE DRAWINGS

FIG. 2 is an overall configuration diagram of a fracture surface inspection device according to a first embodiment of the present invention.

FIG. 10 is an overall configuration diagram of a fracture surface inspection device according to a second embodiment of the present invention.

Figure 1B:
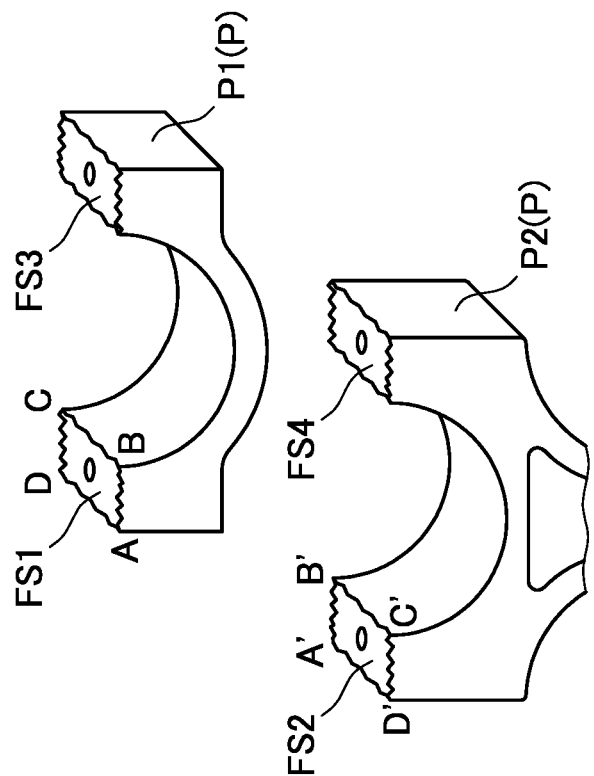
FIG. 1B is an exploded view of the component that is the target of the fracture surface inspection according to the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

Hereinafter, the embodiments of the present invention will be described in detail with reference to the drawings. It should be noted that the present invention is not limited to the contents described below, and can be optionally modified and implemented without departing from the gist thereof. In addition, the drawings used for describing the embodiments are all schematically showing the constituent members, and are partially emphasized, enlarged, reduced, or omitted in order to deepen the understanding. Thus, they may not accurately represent the scale or shape of the constituent members.

First Embodiment

Figure 1A:
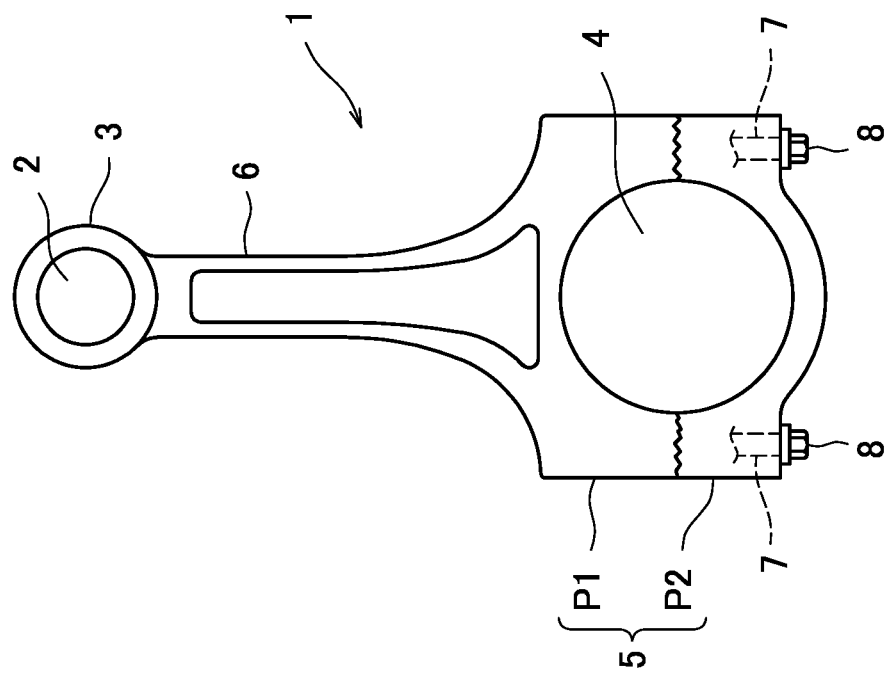
FIG. 1A is a front view of a component that is a target of a fracture surface inspection according to the present invention.

FIGS. 1A and 1B are a front view and an exploded view, respectively, of a component that is a target of a fracture surface inspection according to the present invention. More specifically, the component in the present embodiment is a connecting rod (hereinafter referred to as a connecting rod 1) as a metal component constituting a general vehicle engine. Note that the component to which the fracture surface inspection according to the present invention is applied may be any component that requires an engagement inspection of two fracture surfaces that are generated through fracture splitting, and is not limited to the connecting rod 1.

As shown in FIG. 1A, the connecting rod 1 according to the present embodiment includes a small end portion 3 having a piston pin hole 2, a large end portion 5 having a crank pin hole 4, and a rod 6 for connecting the small end portion 3 and large end portion 5. Further, the large end portion 5 is split into a rod part P1 and a semicircular-shaped cap part P2 so as to sandwich an unillustrated crank pin (FS method: Fracture Splitting). Then, in the connecting rod 1, the rod part P1 and the cap part P2 are fastened in a state in which the crank pin is engaged in the crank pin hole 4 by inserting bolts 8 into a pair of bolt holes 7 formed so as to communicate the rod part P1 and the cap part P2. This makes it possible to use unevenness generated on fracture surfaces of the rod part P1 and the cap part P2 for positioning, thereby allowing the connecting rod 1 to be manufactured at low cost.

Here, in the connecting rod 1, by fracturing and splitting the rod part P1 and the cap part P2 as shown in FIG. 1B, a pair of a first fracture surface FS1 and a second fracture surface FS2 are generated, and a pair of a third fracture surfaces FS3 and a fourth fracture surface FS4 are also generated. Further, in the present embodiment, the following description will be based on the assumption that the shape of each of the fracture surfaces when viewed in a plan view is substantially rectangular, and the vertices of the first fracture surface FS1 and the corresponding second fracture surface FS2 are A to D and A' to D', respectively. Note that hereinafter, the first fracture surface FS1 and the second fracture surface FS2 will be mainly described, and a detailed description of the third fracture surface FS3 and the fourth fracture surface FS4 having the same relation as the first fracture surface FS1 and the second fracture surface FS2 will be omitted.

Now, in the connecting rod 1 formed by the FS method, if a part of the fracture surfaces is lost when the connecting rod is fractured into the rod part P1 and the cap part P2, a gap may be formed on a connecting surface on which the fracture surfaces of the rod part P1 and the cap part P2 are reconnected, and the strength thereof may be deteriorated. Therefore, a fracture surface inspection concerning the state of the fracture surface such as the presence or absence of a loss needs to be performed on the connecting rod 1 on the basis of three-dimensional data on the unevenness of each of the fracture surfaces.

FIG. 2 is an overall configuration diagram of a fracture surface inspection device 10 according to the first embodiment of the present invention. The fracture surface inspection device 10 acquires three-dimensional data on the fracture surface of an inspection target P including the rod part P1 and the cap part P2 and performs the fracture surface inspection. Here, in the present embodiment, the following description will be based on the assumption that the three-dimensional data on the first fracture surface FS1 and the second fracture surface FS2 are acquired individually, but both may be acquired at the same time. Further, the three-dimensional data on the first fracture surface FS1 to the fourth fracture surface FS4 may be acquired at the same time. The fracture surface inspection device 10 is provided with a data acquisition unit 20, a lighting device 30, a transport device 40, and a control device 50.

The data acquisition unit 20 acquires the two-dimensional data and three-dimensional data on the first fracture surface FS1 and the second fracture surface FS2 of the inspection target P. More specifically, the data acquisition unit 20 according to the present embodiment includes an imaging device 21 including, for example, a CCD camera, and a projection device 22 as a projector. Then, the data acquisition unit 20 acquires the two-dimensional data as images of each of the fracture surfaces and the three-dimensional data on each of the fracture surfaces. The three-dimensional data according to the present embodiment is generated by a known phase shift method in the control device 50.

More specifically, the control device 50 projects a light pattern having a sine wave-like light intensity distribution on the fracture surface of the inspection target P from the projection device 22 while changing the phase of the sine wave, and acquires a plurality of images for three-dimensional data generation of the fracture surface through the imaging device 21. Then, the control device 50 can utilize the fact that the light pattern projected on the inspection target P is distorted due to unevenness of the fracture surface, and configure the three-dimensional data on the unevenness on the fracture surface on the basis of the plurality of images for three-dimensional data generation.

The lighting device 30 may be used not only as a light source when the two-dimensional data on the inspection target P is acquired by the imaging device 21, but also as an auxiliary light source when the three-dimensional data is acquired. Note that in the present embodiment, illumination light is projected from both sides of the inspection target P, but the number and the arrangement of the lighting device 30 can be appropriately changed according to the conditions.

The transport device 40 includes, for example, a belt conveyor, and transports the inspection target P to a position for performing the fracture surface inspection, that is, directly under the imaging device 21 in the present embodiment. At this time, the inspection target P is fixed to a pedestal part 40a on the transport device 40 such that the fracture surface thereof faces the imaging device 21.

The control device 50 includes, for example, a known microcomputer control circuit or a general-purpose computer capable of executing a program stored in advance, and controls the entire fracture surface inspection device 10 in an integrated manner. Examples of such controls include execution of procedures related to a fracture surface inspection method described later while controlling each connection destination and transmitting and receiving signals by being connected to the data acquisition unit 20, the lighting device 30, and the transport device 40. Further, the control device 50 includes, as functional modules related to data processing, a contour extraction unit 51, a transformation amount calculation unit 52, a distortion correction unit 53, a plane calculation unit 54, a correction amount calculation unit 55, a comparison unit 56, and an undulation determination unit 57. The function of each module will be described together with the fracture surface inspection method described later.

Figure 3A:
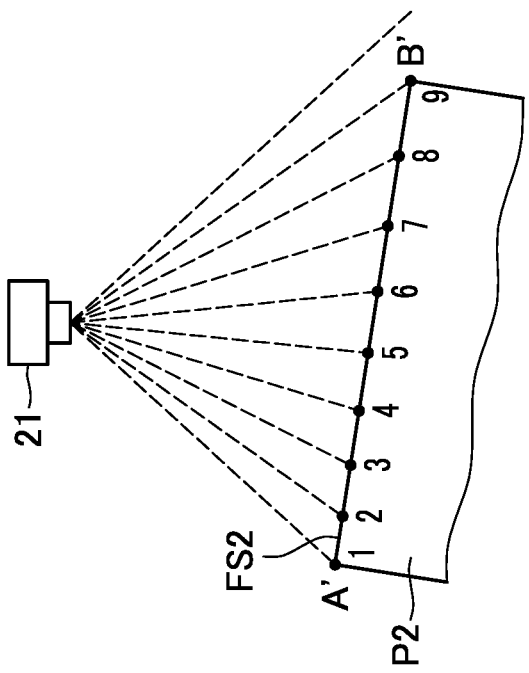
FIG. 3A is a side view schematically showing one of the states at which a first fracture surface and a second fracture surface are imaged at different angles from each other with respect to an imaging device.
Figure 3B:
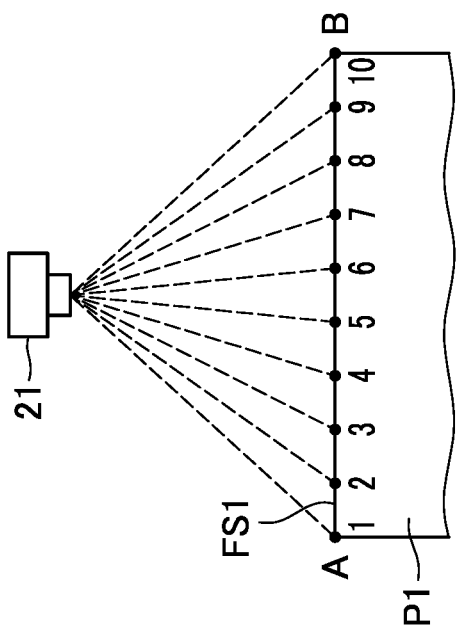
FIG. 3B is a side view schematically showing the other one of the states at which the first fracture surface and the second fracture surface are imaged at different angles from each other with respect to the imaging device.

Next, problems in the fracture surface inspection will be described with reference to FIGS. 3A, 3B, 4A, and 4B. FIGS. 3A and 3B are side views schematically showing states in which the first fracture surface FS1 and the second fracture surface FS2 are respectively imaged at different angles from each other with respect to the imaging device 21. More specifically, FIG. 3A shows a case in which the first fracture surface FS1 of the rod part P1 is imaged in a state of being substantially parallel to a lens surface of the imaging device 21, and FIG. 3B shows a case in which the second fracture surface FS2 of the cap part P2 is imaged in a state of being inclined to the lens surface of the imaging device 21. For example, the state as shown in FIG. 3B can occur when the cap part P2 is fixed to the pedestal part 40a in a slightly inclined state. Note that in FIG. 3B, the inclination angle of the second fracture surface FS2 is shown while being greatly emphasized. Further, in FIGS. 3A, 3B, 4A, and 4B, radial broken lines represent a concept of sampling by the imaging device 21 within the angle of view at equal angles.

When the first fracture surface FS1 is imaged in the state shown in FIG. 3A and the second fracture surface FS2 is imaged in the state shown in FIG. 3B, the number of pieces of data in the imaged images of each of the fracture surfaces is different from each other. In addition, even if the first fracture surface FS1 and the second fracture surface FS2 are moved in parallel such that position coordinates of the corresponding point A and point A' are aligned, the coordinates of the data points on the two corresponding fracture surfaces are displaced and not matched. As a result, it is not possible to compare the corresponding positions. Furthermore, since the fracture surfaces themselves of the rod part P1 and the cap part P2 may be formed, at the time of fracture splitting, to be inclined with respect to the large end portion 5. Combined with the inclination at the time of fixing to the pedestal part 40a, this makes it more difficult to compare the first fracture surface FS1 and the second fracture surface FS2.

Figure 4B:
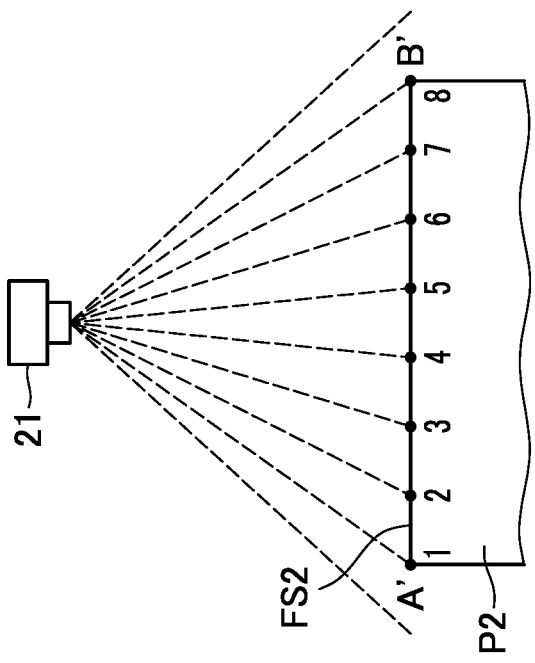
FIG. 4B is a side view schematically showing the other one of the states at which the first fracture surface and the second fracture surface are imaged at different distances from each other with respect to the imaging device.
Figure 4A:
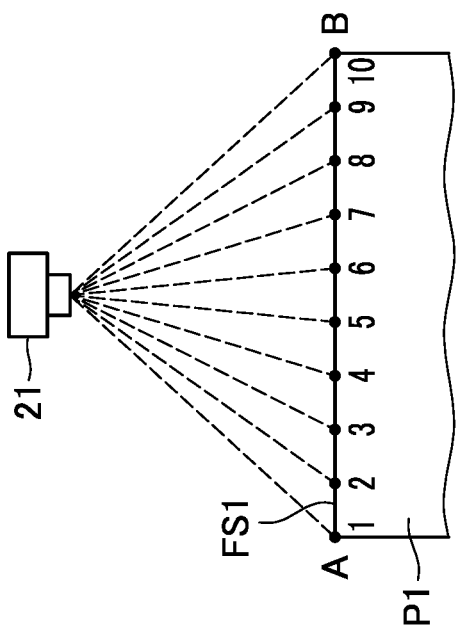
FIG. 4A is a side view schematically showing one of the states at which the first fracture surface and the second fracture surface are imaged at different distances from each other with respect to the imaging device.

FIGS. 4A and 4B are side views schematically showing states in which the first fracture surface FS1 and the second fracture surface FS2 are respectively imaged at different distances from each other with respect to the imaging device 21. More specifically, FIG. 4A shows a case in which the first fracture surface FS1 of the rod part P1 is imaged in a state of being relatively close to the lens surface of the imaging device 21, and FIG. 4B shows a case in which the second fracture surface FS2 of the cap part P2 is imaged in a state of being relatively far from the lens surface of the imaging device 21. For example, the state as shown in FIG. 4B can occur when the rod part P1 and the cap part P2 are fixed to the pedestal part 40a in forms different from each other due to their difference in shape or when the positions at which they are fractured in the large end portion 5 are slightly displaced. Note that in FIGS. 4A and 4B, the differences in distance from the imaging device 21 to the first fracture surface FS1 and from the imaging device 21 to the second fracture surface FS2 are respectively shown while being greatly emphasized.

When the first fracture surface FS1 is imaged in the state shown in FIG. 4A and the second fracture surface FS2 is imaged in the state shown in FIG. 4B, the number of pieces of data in the imaged images of each of the fracture surfaces is different from each other. In addition, even if the first fracture surface FS1 and the second fracture surface FS2 are moved in parallel such that the position coordinates of the corresponding points A and A' are aligned, the coordinates of the data points on the two corresponding fracture surfaces are displaced and not matched. As a result, it is also not possible to compare the corresponding positions.

Figure 5:
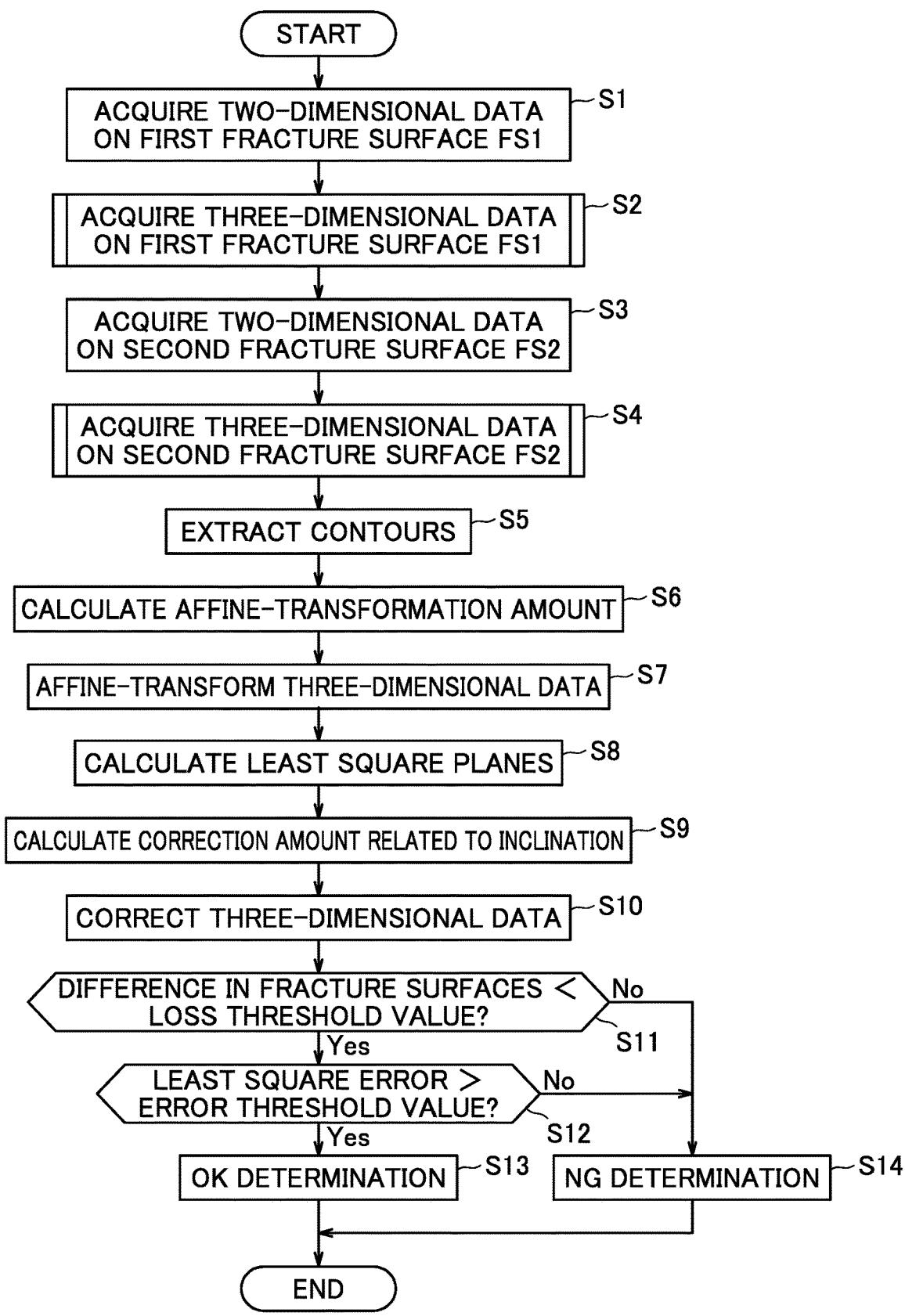
FIG. 5 is a flowchart showing procedures of a fracture surface inspection method according to the present invention.

Subsequently, the fracture surface inspection method of the present invention for solving the above problems in the fracture surface inspection will be described. FIG. 5 is a flowchart showing procedures of the fracture surface inspection method according to the present invention. The control device 50 inspects the fracture surfaces of the rod part P1 and the cap part P2 by executing a program shown in the flowchart of FIG. 5.

When the program related to the fracture surface inspection method is started, the control device 50 controls the transport device 40 so as to transfer the rod part P1 directly under the imaging device 21, and then acquires the two-dimensional data on the first fracture surface FS1 through the imaging device 21 (step S1). In other words, the imaging device 21 images the first fracture surface FS1 of the rod part P1.

Subsequently, while causing the transport device 40 to stop, the control device 50 acquires a plurality of images for three-dimensional data generation by the phase shift method through the data acquisition unit 20, and then acquires the three-dimensional data on the first fracture surface FS1 (Step S2). Note that since there is no change in positional relation between the imaging device 21 and the first fracture surface FS1 in steps S1 and S2, imaging regions of the two-dimensional data and the three-dimensional data imaged in both steps are exactly the same.

Next, the control device 50 controls the transport device 40 so as to transport the cap part P2 directly under the imaging device 21, and then acquires the two-dimensional data on the second fracture surface FS2 through the imaging device 21 (step S3). In other words, the imaging device 21 images the second fracture surface FS2 of the cap part P2.

Further, while causing the transport device 40 to stop, the control device 50 acquires a plurality of images for three-dimensional data generation by the phase shift method through the data acquisition unit 20, and then acquires the three-dimensional data on the second fracture surface FS2 (step S4). Note that since there is also no change in positional relation between the imaging device 21 and the second fracture surface FS2 in steps S3 and S4, imaging regions of the two-dimensional data and the three-dimensional data imaged in both steps are exactly the same.

Here, in the present embodiment, the two-dimensional data and the three-dimensional data are acquired for each of the first fracture surface FS1 and the second fracture surface FS2. However, as long as the data acquisition unit 20 acquires the two-dimensional data and the three-dimensional data at the same position and at the same angle with respect to each of the first fracture surface FS1 and the second fracture surface FS2, the steps S1 to S4 may be performed in any order or may be performed at the same time in parallel (a data acquisition step).

When the two-dimensional data and the three-dimensional data on each of the fracture surfaces are acquired, the contour extraction unit 51 of the control device 50 extracts a first contour of the first fracture surface FS1 and a second contour of the second fracture surface FS2 in the respective two-dimensional data on the rod part P1 and the cap part P2 (step S5, a contour extraction step). The contour extraction can be performed by using a method, such as edge detection, that is typically used in the field of image processing.

Figure 6:
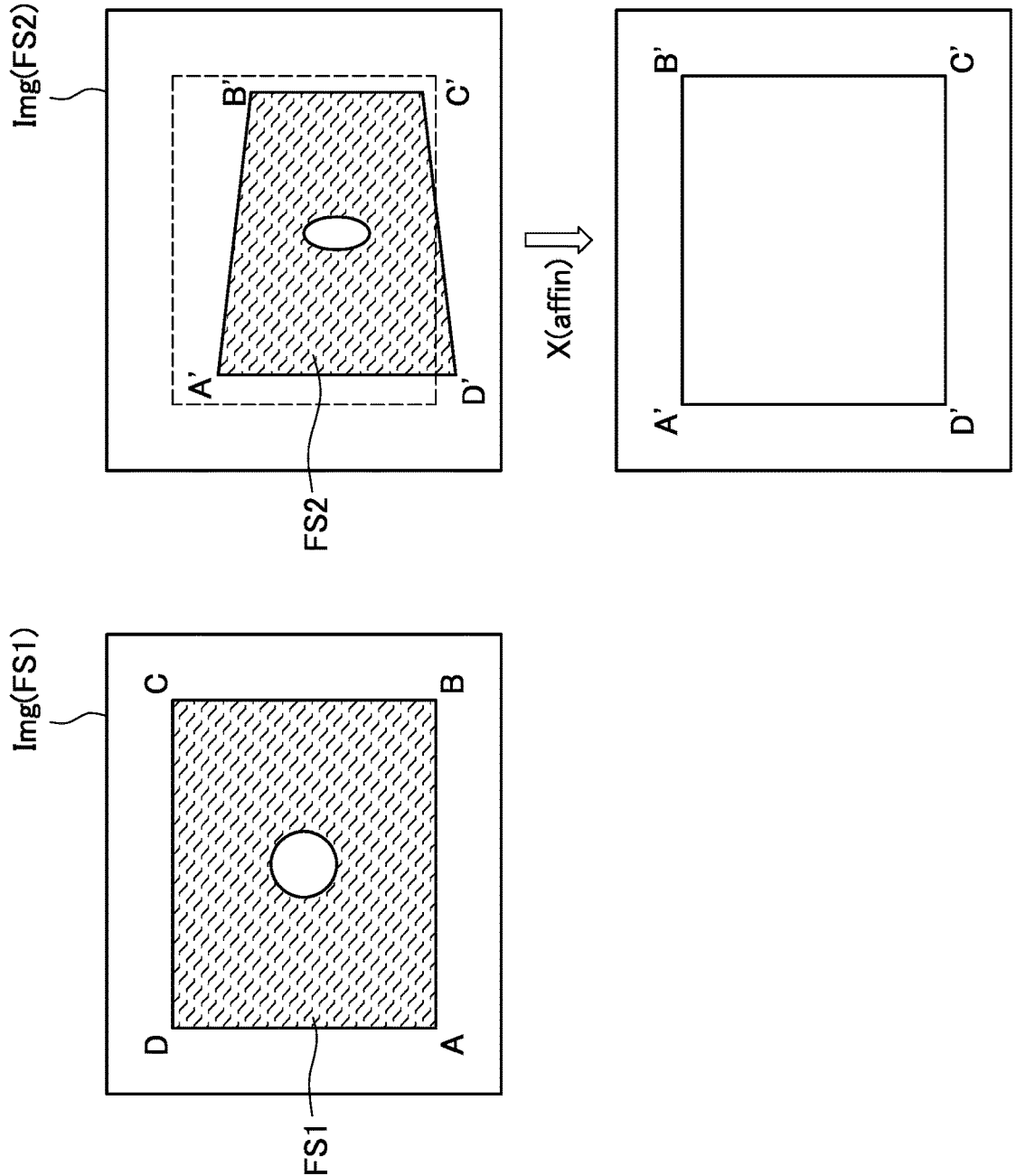
FIG. 6 is a schematic diagram showing an example of two-dimensional data on the first fracture surface and the second fracture surface.

FIG. 6 is a schematic view showing an example of the two-dimensional data on the first fracture surface FS1 and the second fracture surface FS2. Here, in the present embodiment, when the first fracture surface FS1 is arranged substantially parallel to the lens surface of the imaging device 21 as shown in FIG. 4A, for example, two-dimensional data on the first fracture surface FS1 as shown by Img(FS1) in FIG. 6 is acquired. In this case, the contour extraction unit 51 extracts a first contour ABCD of a rectangular shape from the two-dimensional data Img(FS1) on the first fracture surface FS1 at the timing of step S5.

On the other hand, when the second fracture surface FS2 is imaged in a state of being arranged so as to be inclined to and relatively far from the lens surface of the imaging device 21 as shown in FIGS. 3B and 4B and further of being displaced from the center of the angle of view, for example, two-dimensional data as shown by two-dimensional data Img(FS2) on the second fracture surface FS2 in FIG. 6 is acquired. In this case, the contour extraction unit 51 extracts a second contour A'B'C'D' of a trapezoidal shape from the two-dimensional data Img(FS2) on the second fracture surface FS2 at the timing of step S5. Note that the contour of each of the fracture surfaces may have another shape depending on the inclination angle and the inclination direction with respect to the imaging device 21.

Here, on the two-dimensional data Img(FS2) on the second fracture surface FS2 in FIG. 6, the first contour of the first fracture surface FS1 is superimposed and shown by a broken line. In this manner, when the first contour and the second contour are different from each other, it is not possible to simply compare the corresponding position coordinates between the first fracture surface FS1 and the second fracture surface FS2 on a plane (XY plane) parallel to the lens surface of the imaging device 21. Therefore, the transformation amount calculation unit 52 of the control device 50 performs an affine transformation so that the extracted second contour is matched to the first contour, and calculates a transformation amount X(affine) at that time (step S6, a transformation amount calculation step).

Figure 7:
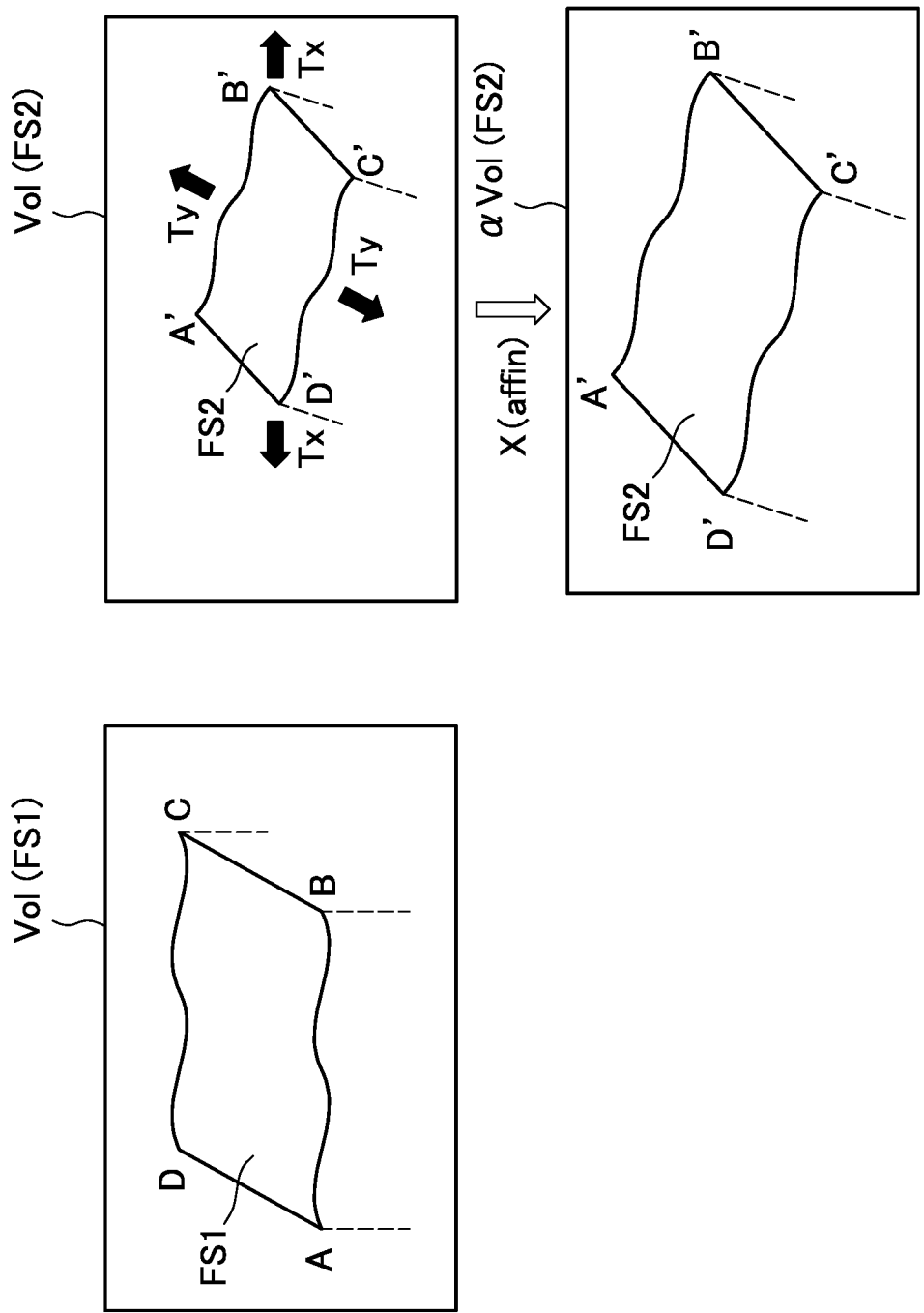
FIG. 7 is a schematic diagram showing an example of three-dimensional data on the first fracture surface and the second fracture surface.

Next, the distortion correction unit 53 of the control device 50 affine-transforms the three-dimensional data on the second fracture surface FS2 by using the transformation amount X(affine) calculated on the basis of the two-dimensional data (step S7, a distortion correction step). FIG. 7 is a schematic view showing an example of the three-dimensional data on the first fracture surface FS1 and the second fracture surface FS2. Here, in FIG. 7, the three-dimensional data on the first fracture surface FS1 and the second fracture surface FS2 acquired in the data acquisition step are shown as Vol(FS1) and Vol(FS2), respectively.

In the distortion correction step, the distortion correction unit 53 calculates distortion correction data αVol(FS2) for the second fracture surface FS2 by performing an affine transformation, with the transformation amount X(affine), to the three-dimensional data Vol(FS2) on the second fracture surface FS2 in the axial direction of the XY plane as indicated by the arrows Tx and Ty in the drawing. At this time, the distortion correction unit 53 increases the number of pieces of data by compensation processing such that coordinate positions of data points in the distortion correction data αVol(FS2) are matched to the respective coordinate positions of the three-dimensional data Vol(FS1) on the first fracture surface FS1. The compensation processing can be performed by using a method, such as linear compensation, that is typically used in the field of image processing.

Here, when the relative inclination angle between the first fracture surface FS1 and the second fracture surface FS2 with respect to the lens surface of the imaging device 21 is small enough to be ignored, the fracture surface inspection can be performed by comparing the three-dimensional data Vol(FS1) on the first fracture surface FS1 and the distortion correction data αVol(FS2) on the second fracture surface FS2. On the other hand, when the inclination angle is so large that it cannot be ignored, the control device 50 may calculate the size of the inclination angle by a plane calculation step, which will be described below, and correct the distortion data αVol(FS2) in the Z direction perpendicular to the XY plane.

Figure 8:
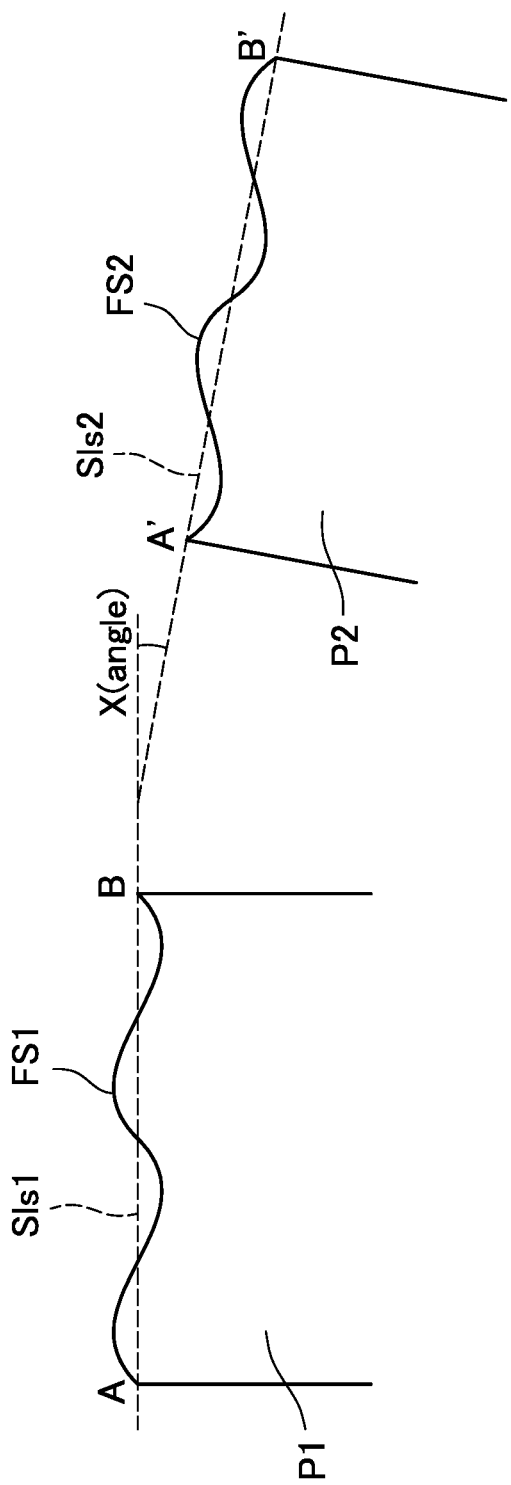
FIG. 8 is a schematic diagram showing a plane calculation step.

FIG. 8 is a schematic view showing the plane calculation process. The plane calculation unit 54 of the control device 50 calculates a first least square plane Sls1 that approximates the first fracture surface FS1 on a plane and a second least square plane Sls2 that approximates the second fracture surface FS2 on a plane in order to grasp the relative inclination angle between the first fracture surface FS1 and the second fracture surface FS2 in the respective three-dimensional data thereof (step S8, the plane calculation step).

More specifically, on the three-dimensional data on the first fracture surface FS1, the plane calculation unit 54 specifies the first least square plane Sls1 having an inclination angle in which a square error with the first fracture surface FS1 is least by calculating the least square error with a plane whose inclination angle is a variable. Further, in the same manner, on the three-dimensional data on the second fracture surface FS2, the plane calculation unit 54 specifies the second least square plane Sls2 having an inclination angle in which a square error with the second fracture surface FS2 is least. Thereby, the plane calculation unit 54 calculates a correction amount X(angle) when the second least square plane Sls2 is transformed to the first least square plane Sls1 in order to align the height information (Z direction) perpendicular to the XY plane in the three-dimensional data (step S9, a correction amount calculation step). Note that since the calculation method itself of the least square error is known, a detailed description thereof will be omitted here. Also, at least one of the least square errors will be used in a later step.

Figure 9:
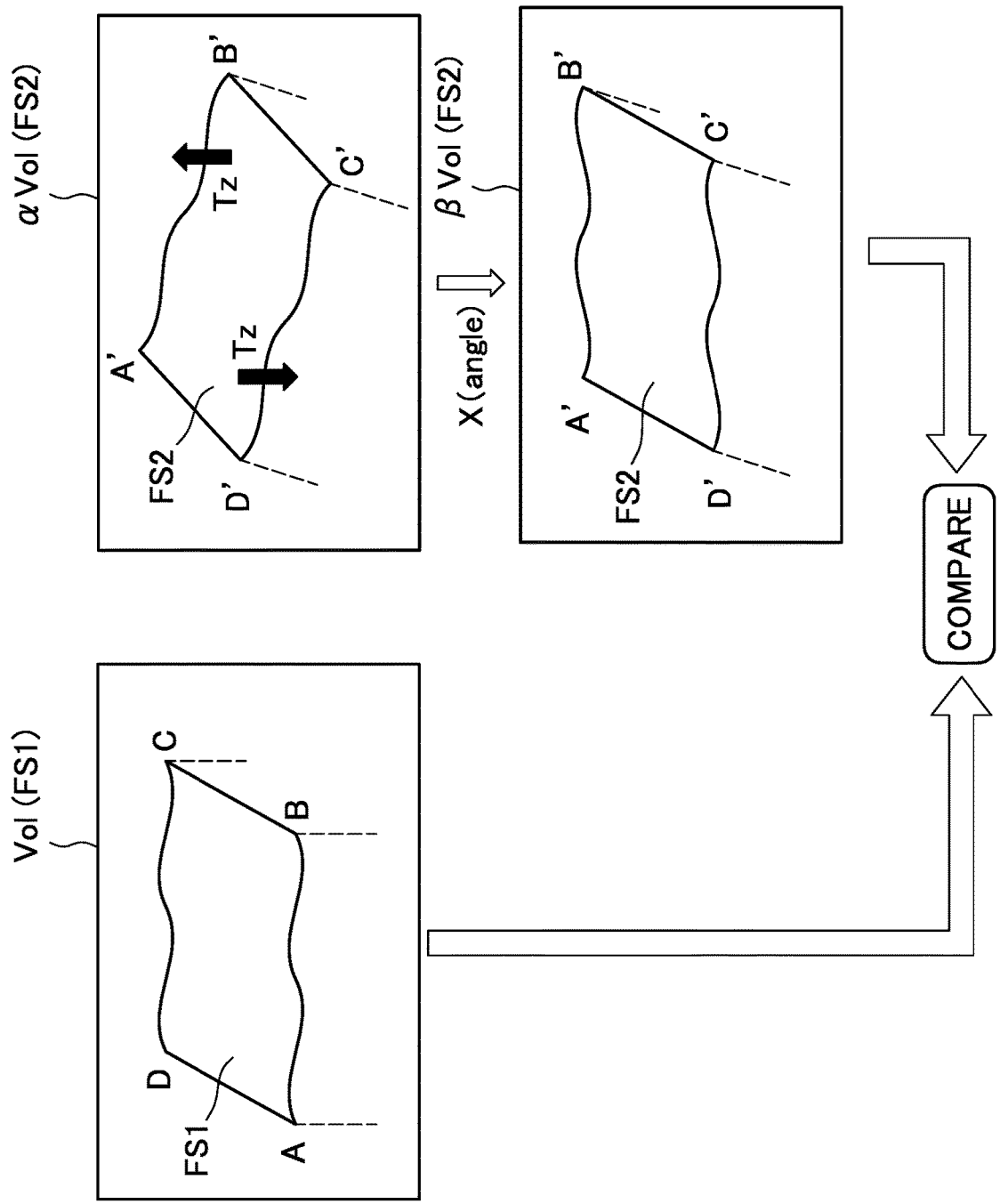
FIG. 9 is a schematic diagram showing a step in which distortion correction data on the second fracture surface is corrected according to an inclination angle.

FIG. 9 is a schematic view showing a step in which the distortion correction data αVol(FS2) on the second fracture surface FS2 is corrected according to the inclination angle. Here, the distortion correction unit 53 of the control device 50 calculates the distortion correction data βVol(FS2) corrected in the Z direction by correcting, on the basis of the correction amount X(angle), respective data points in the distortion correction data αVol(FS2) on the second fracture surface FS2 in the Z direction as shown by arrows Tz in the drawing (step S10). Thereby, the unevenness of the second fracture surface FS2 is calculated as the distortion correction data βVol(FS2) that can be compared with the three-dimensional data Vol(FS1) on the first fracture surface FS1 even when the relative inclination angle of the second fracture surface FS2 to the first fracture surface FS1 is relatively large.

Then, when the distortion correction data βVol(FS2) is obtained in step S10, the comparison unit 56 of the control device 50 calculates a correspondence relation in the uneven state between the first fracture surface FS1 and the second fracture surface FS2 by comparing the three-dimensional data Vol(FS1) on the first fracture surface FS1 and the distortion correction data βVol(FS2) on the second fracture surface FS2 for each corresponding coordinate position.

More specifically, the comparison unit 56 calculates a difference value (an amount of loss) between the fracture surfaces of the three-dimensional data Vol(FS1) on the first fracture surface FS1 and the distortion correction data βVol(FS2), and determines whether or not the difference value is smaller than a predetermined loss threshold value optionally set in advance (step S11, a comparison step). If it is determined that the difference value is smaller than the loss threshold value in step S11 (Yes in step S11), it can be confirmed that the amount of loss when the rod part P1 and the cap part P2 are reconnected is sufficiently small.

Now, even in a state in which the amount of loss of the first fracture surface FS1 and the second fracture surface FS2 is sufficiently small, there is a possibility that the effect of the FS method that uses the unevenness of each of the fracture surfaces for positioning cannot be fully exerted if each of the fracture surfaces has extremely small unevenness and a high degree of flatness. Therefore, in addition to the above loss evaluation, the control device 50 performs undulation determination to determine whether or not sufficient unevenness exists on each of the fracture surfaces.

More specifically, since the least square error of at least one of the first fracture surface FS1 and the second fracture surface FS2 calculated in the plane calculation step can be used as an index of the unevenness of the fracture surface, the undulation determination unit 57 of the control device 50 can determine that sufficient unevenness exists in each of the fracture surfaces when the least square error is larger than a predetermined error threshold value set optionally in advance (step S12, an undulation determination step). Thereby, in addition to the loss evaluation in each of the fracture surfaces, the control device 50 can perform an evaluation on whether or not the undulation of each of the fracture surfaces is sufficient.

Then, if both of the loss evaluation and the undulation evaluation of each of the fracture surfaces described above are good (Yes in step S12), the control device 50 makes an OK determination by determining each of the fracture surfaces of the inspection target P is in a good state suitable for reconnection (step S13), and ends a series of program processing related to the fracture surface inspection method.

On the other hand, if either one of the loss evaluation or the undulation evaluation of each of the fracture surfaces described above is not good (No in step S11 or step S12), the control device 50 makes an NG determination by determining each of the fracture surfaces of the inspection target P is not in a good state (Step S14), and ends the series of program processing related to the fracture surface inspection method. Note that when a plurality of inspection targets P are successively inspected, the programs may be successively executed.

As described above, for the first fracture surface FS1 and the second fracture surface FS2 to be inspected, the fracture surface inspection device 10 according to the present invention calculates, on the basis of the two-dimensional data Img(FS2) and Img(FS1), the first contour and the second contour, respectively, and then affine-transforms the three-dimensional data Vol(FS2) on the second fracture surface FS2 by using the transformation amount X(affine) in which the second contour is affine-transformed to the first contour. Coordinates of data points of the distortion correction data αVol(FS2) on the second fracture surface obtained at this time are matched to those of the three-dimensional data Vol(FS1) on the first fracture surface FS1 when viewed in a plan view from the direction in which the three-dimensional data is acquired. As a result, the fracture surface inspection device 10 can compare the three-dimensional data Vol(FS1)

on the first fracture surface FS1 and the distortion correction data αVol(FS2) on the second fracture surface FS2 for each data point. Further, since not only the calculation of the transformation amount X(affine) related to the affine transformation but also the affine transformation to the distortion correction data αVol(FS2) are calculated only in the two-dimensional coordinates, arithmetic processing can be speeded up. Therefore, according to the fracture surface inspection device 10 according to the first embodiment of the present invention, it is possible to inspect the fracture surfaces of a component at high speed and with high accuracy.

Further, according to the fracture surface inspection device 10 according to the first embodiment of the present invention, the two-dimensional data and the three-dimensional data on each of the fracture surfaces are acquired by the same imaging device 21. As a result, the imaging regions of the two-dimensional data and the three-dimensional data are always completely matched, thereby making it possible to inspect the fracture surfaces of a component at higher speed and with higher accuracy.

Furthermore, according to the fracture surface inspection device 10 according to the first embodiment of the present invention, even when the relative inclination angle between the first fracture surface FS1 and the second fracture surface FS2 is relatively large with respect to the data acquisition unit 20, it is possible to inspect the fracture surfaces of a component at higher speed and with higher accuracy by calculating the first least square plane Sls1 of the first fracture surface FS1 and the second least square plane Sls2 of the second fracture surface FS2, and correcting the respective data points of the distortion correction data αVol(FS2) in the direction Tz perpendicular to the affine transformation on the basis of the correction amount X(angle) corresponding to the relative inclination angle between the first least square plane Sls1 and the second least square plane Sls2.

Then, according to the fracture surface inspection device 10 according to the first embodiment of the present invention, the least square error between each of the fracture surfaces and the least square plane as an approximate plane thereof is calculated on the basis of the three-dimensional data on each of the fracture surfaces. As a result, it is possible to determine whether or not the unevenness of each of the fracture surfaces has sufficient undulation suitable for the FS method.

Second Embodiment

Subsequently, the fracture surface inspection device 60 according to a second embodiment of the present invention will be described. The fracture surface inspection device 60 according to the second embodiment is different from the first embodiment in the configuration of the data acquisition unit 20 and the data acquisition method of the inspection target P in the fracture surface inspection device 10 of the above embodiment. Hereinafter, differences from the first embodiment will be described, and the elements common to those of the first embodiment will be denoted by the same reference signs and a detailed description thereof will be omitted.

FIG. 10 is an overall configuration diagram of the fracture surface inspection device 60 according to the second embodiment of the present invention. The data acquisition unit 20 of the fracture surface inspection device 60 includes the imaging device 21 similar to that of the first embodiment arranged so as to acquire two-dimensional data on a fracture surface from diagonally above the inspection target P, and a three-dimensional measurement device 23 for acquiring three-dimensional data on the fracture surface from directly above the inspection target P. Here, as the three-dimensional measurement device 23, a known non-contact surface measurement device using a laser can be adopted, for example.

In other words, in the second embodiment, the two-dimensional data and the three-dimensional data on each of the fracture surfaces are independently acquired by the imaging device 21 and the three-dimensional measurement device 23. At this time, the relative arrangement and the relative angle of view between the imaging device 21 and the three-dimensional measurement device 23 are set in a fixed and known manner so that the measurement region can be positioned by coordinate transformation.

As a result, to the fracture surface inspection device 60 according to the second embodiment, the procedures of the fracture surface inspection method shown in FIG. 5 can be applied as they are, without having to acquire the two-dimensional data and the three-dimensional data on each of the fracture surfaces at the same position and at the same angle. Therefore, the fracture surface inspection device 60 can calculate the distortion correction data αVol(FS2) by transforming the three-dimensional data Vol(FS2) on the second fracture surface FS2 with the transformation amount X(affine), as in the first embodiment, and inspect the fracture surfaces of a component at high speed and with high accuracy.

This concludes the description of the embodiments of the present invention, but the present invention is not limited to the above embodiments. For example, in the first embodiment described above, the contour shape when each of the fracture surfaces of the connecting rod 1 is viewed in a plan view is illustrated as a rectangle, but the actual contour shape is not limited to this and can take various shapes. Further, in the first embodiment described above, the phase shift method is illustrated as a method of acquiring the three-dimensional data, but other methods may be used as long as the three-dimensional data can be acquired by the imaging device 21 for acquiring the two-dimensional data. Furthermore, in the first embodiment described above, the mode is illustrated in which the second fracture surface FS2 of the rod part P2 is transformed so as to be matched to the first fracture surface FS1 of the cap part P1, but the first fracture surface FS1 of the cap part P1 may be transformed so as to be matched to the second fracture surface FS2 of the rod part P2. Then, in the first embodiment described above, in the fracture surface inspection method shown in FIG. 5, the mode is illustrated in which the correction in step S10 is performed after the affine transformation in step S7, but the distortion correction data βVol(FS2) may be calculated from the three-dimensional data Vol(FS2) on the second fracture surface FS2 by a new correction amount obtained by synthesizing the transformation amount X(affine) and the correction amount X(affine).

<Aspects of the Present Invention>

A first aspect of the present invention is a fracture surface inspection device for inspecting a first fracture surface and a second fracture surface that are generated through fracture splitting of a component, which is provided with a data acquisition unit configured to acquire two-dimensional data and three-dimensional data on the first fracture surface and the second fracture surface, a contour extraction unit configured to extract, from the two-dimensional data, a first contour of the first fracture surface and a second contour of the second fracture surface, a transformation amount calculation unit configured to calculate a transformation amount when the second contour is affine-transformed to the first contour, a distortion correction unit configured to calculate distortion correction data by affine-transforming the three-dimensional data on the second fracture surface with the transformation amount, and a comparison unit configured to compare the three-dimensional data on the first fracture surface and the distortion correction data.

For the first fracture surface and the second fracture surface to be inspected, the fracture surface inspection device calculates, on the basis of the two-dimensional data, the first contour and the second contour, respectively, and then affine-transforms the three-dimensional data on the second fracture surface by using the transformation amount in which the second contour is affine-transformed to the first contour. Coordinates of data points of the distortion correction data on the second fracture surface obtained at this time are matched to those of the three-dimensional data on the first fracture surface when viewed in a plan view from the direction in which the three-dimensional data is acquired. As a result, the fracture surface inspection device can compare the three-dimensional data on the first fracture surface and the distortion correction data on the second fracture surface for each data point. Further, since not only the calculation of the transformation amount related to the affine transformation but also the affine transformation to the distortion correction data are calculated only in the two-dimensional coordinates, arithmetic processing can be speeded up. Therefore, according to the fracture surface inspection device according to the first aspect of the present invention, it is possible to inspect the fracture surfaces of a component at high speed and with high accuracy.

A second aspect of the present invention is the fracture surface inspection device in the first aspect of the present invention described above, in which the data acquisition unit acquires the two-dimensional data and the three-dimensional data at the same position and at the same angle.

According to the fracture surface inspection device according to the second aspect of the present invention, the two-dimensional data and the three-dimensional data on each of the fracture surfaces are acquired by, for example, the same imaging device. As a result, imaging regions of the two-dimensional data and the three-dimensional data are always completely matched, thereby making it possible to inspect the fracture surfaces of a component at higher speed and with higher accuracy.

A third aspect of the present invention is the fracture surface inspection device in the first or second aspect of the present invention described above, which is provided with a plane calculation unit configured to calculate, from the three-dimensional data, a first least square plane of the first fracture surface and a second least square plane of the second fracture surface, and a correction amount calculation unit configured to calculate a correction amount when the first least square plane is transformed to the second least square plane, in which the comparison unit compares the three-dimensional data on the first fracture surface and the distortion correction data corrected by the correction amount.

According to the fracture surface inspection device according to the third aspect of the present invention, the least square plane of each of the fracture surfaces is calculated, and respective data points of the distortion correction data are corrected in the direction perpendicular to the affine transformation on the basis of a correction amount corresponding to a relative inclination angle between the least square planes. As a result, even when the relative inclination angle between the first fracture surface and the second fracture surface is relatively large, it is possible to inspect the fracture surfaces of a component at higher speed and with higher accuracy.

A fourth aspect of the present invention is the fracture surface inspection device in any of the first to third aspects of the present invention described above, which is provided with an undulation determination unit configured to compare, with a predetermined error threshold value, a least square error with respect to the least square plane of at least one of the first fracture surface and the second fracture surface.

According to the fracture surface inspection device according to the fourth aspect of the present invention, the least square error between each of the fracture surfaces and the least square plane as an approximate plane thereof is calculated on the basis of the three-dimensional data on each of the fracture surfaces. As a result, it is possible to determine whether or not the unevenness of each of the fracture surfaces has sufficient undulation suitable for the FS method.

A fifth aspect of the present invention is a fracture surface inspection method for inspecting a first fracture surface and a second fracture surface that are generated through fracture splitting of a component, which includes a data acquisition step of acquiring two-dimensional data and three-dimensional data on the first fracture surface and the second fracture surface, a contour extraction step of extracting, from the two-dimensional data, a first contour of the first fracture surface and a second contour of the second fracture surface, a transformation amount calculation step of calculating a transformation amount when the second contour is affine-transformed to the first contour, a distortion correction step of calculating distortion correction data by affine-transforming the three-dimensional data on the second fracture surface with the transformation amount, and a comparison step of comparing the three-dimensional data on the first fracture surface and the distortion correction data.

In the fracture surface inspection method, for the first fracture surface and the second fracture surface to be inspected, the first contour and the second contour are respectively calculated on the basis of the two-dimensional data. In addition, the three-dimensional data on the second fracture surface is affine-transformed by using the transformation amount in which the second contour is affine-transformed to the first contour. Coordinates of data points of the distortion correction data on the second fracture surface obtained at this time are matched to those of the three-dimensional data on the first fracture surface when viewed in a plan view from the direction in which the three-dimensional data is acquired. As a result, according to the fracture surface inspection method, it is possible to compare the three-dimensional data on the first fracture surface and the distortion correction data on the second fracture surface for each data point. Further, since not only the calculation of the transformation amount related to the affine transformation but also the affine transformation to the distortion correction data is calculated only in the two-dimensional coordinates, arithmetic processing can be speeded up. Therefore, according to the fracture surface inspection method according to the fifth aspect of the present invention, it is possible to inspect the fracture surfaces of a component at high speed and with high accuracy.

A sixth aspect of the present invention is the fracture surface inspection method in the fifth aspect of the present invention described above, in which in the data acquisition step, the two-dimensional data and the three-dimensional data are acquired at the same position and at the same angle.

According to the fracture surface inspection method according to the sixth aspect of the present invention, the two-dimensional data and the three-dimensional data on each of the fracture surfaces are acquired by, for example, the same imaging device. As a result, imaging regions of the two-dimensional data and the three-dimensional data are always completely matched, thereby making it possible to inspect the fracture surfaces of a component at higher speed and with higher accuracy.

A seventh aspect of the present invention is the fracture surface inspection method in the fifth or sixth aspect of the present invention described above, which includes a plane calculation step of calculating, from the three-dimensional data, a first least square plane of the first fracture surface and a second least square plane of the second fracture surface, and a correction amount calculation step of calculating a correction amount when the first least square plane is transformed to the second least square plane, in which in the comparison step, the three-dimensional data on the first fracture surface and the distortion correction data corrected by the correction amount are compared.

According to the fracture surface inspection method according to the seventh aspect of the present invention, the least square plane of each of the fracture surfaces is calculated, and respective data points of the distortion correction data are corrected in the direction perpendicular to the affine transformation on the basis of a correction amount corresponding to a relative inclination angle between the least square planes. As a result, even when the relative inclination angle between the first fracture surface and the second fracture surface is relatively large with respect to the data acquisition unit, it is possible to inspect the fracture surfaces of a component at higher speed and with higher accuracy.

An eighth aspect of the present invention is the fracture surface inspection method in the fifth to seventh aspects of the present invention described above, which includes an undulation determination step of comparing, with a predetermined error threshold value, a least square error with respect to the least square plane of at least one of the first fracture surface and the second fracture surface.

According to the fracture surface inspection method according to the eighth aspect of the present invention, the least square error between each of the fracture surfaces and the least square plane as an approximate plane thereof is calculated on the basis of the three-dimensional data on each of the fracture surfaces. As a result, it is possible to determine whether or not the unevenness of each of the fracture surfaces has sufficient undulation suitable for the FS method.

EXPLANATION OF REFERENCE SIGNS

1 Connecting rod
10, 60 Fracture surface inspection device
20 Data acquisition unit
50 Control device
51 Contour extraction unit
52 Transformation amount calculation unit
53 Distortion correction unit
54 Plane calculation unit
55 Correction amount calculation unit
56 Comparison unit
57 Undulation determination unit
P1 Cap part
P2 Rod part
FS1 First fracture surface
FS2 Second fracture surface Although the present invention has been described with reference to preferred embodiments, workers skilled in the art will recognize that changes may be made in form and detail without departing from the spirit and scope of the invention.

The invention claimed is:

1. A fracture surface inspection device for inspecting a first fracture surface and a second fracture surface that are generated through fracture splitting of a component, comprising:
   a data acquisition unit configured to acquire two-dimensional data and three-dimensional data on the first fracture surface and the second fracture surface;
   a transport device configured to transport the first fracture surface and the second fracture surface of the component to respective positions for inspection, such that the first fracture surface and the second fracture surface face the data acquisition unit;
   a contour extraction unit configured to extract, from the two-dimensional data, a first contour of the first fracture surface and a second contour of the second fracture surface;
   a transformation amount calculation unit configured to calculate a transformation amount when the second contour is affine-transformed to the first contour,
   a distortion correction unit configured to calculate distortion correction data by affine-transforming the three-dimensional data on the second fracture surface with the transformation amount; and
   a comparison unit configured to compare the three-dimensional data on the first fracture surface and the distortion correction data,
   wherein the comparison unit is further configured to output a loss evaluation determination as a function of the comparison of the three-dimensional data on the first fracture surface and the distortion correction data.

2. The fracture surface inspection device according to claim 1, wherein the data acquisition unit acquires the two-dimensional data and the three-dimensional data at the same position and at the same angle on the first fracture surface and on the second fracture surface, respectively.

3. The fracture surface inspection device according to claim 1, further comprising:
   a plane calculation unit configured to calculate, from the three-dimensional data, a first least square plane of the first fracture surface and a second least square plane of the second fracture surface; and
   a correction amount calculation unit configured to calculate a correction amount when the first least square plane is transformed to the second least square plane,
   wherein the comparison unit compares the three-dimensional data on the first fracture surface and the distortion correction data corrected by the correction amount.

4. The fracture surface inspection device according to claim 1, further comprising an undulation determination unit configured to compare, with a predetermined error threshold value, a least square error with respect to the least square plane of at least one of the first fracture surface and the second fracture surface.

5. The fracture surface inspection device according to claim 1, wherein the data acquisition unit comprises:
   a projector capable of projecting a light pattern at an inspection target; and
   an imaging device arranged to acquire images of the inspection target to acquire two-dimensional data and three-dimensional data on the first fracture surface and the second fracture surface.

6. The fracture surface inspection device according to claim 1, wherein the data acquisition unit comprises:
- an imaging device configured to acquire two-dimensional data on the first fracture surface and the second fracture surface; and
- a non-contact surface measurement device configured to acquire three-dimensional data on the first fracture surface and the second fracture surface using a laser.

7. The fracture surface inspection device according to claim 1, wherein the component is a connecting rod for connecting a piston with a crankshaft, wherein the first fracture surface is located on a rod part of the connecting rod, and wherein the second fracture surface is located on a cap part of the connecting rod.

8. A fracture surface inspection method for inspecting a first fracture surface and a second fracture surface that are generated through fracture splitting of a component, comprising:
- transporting the first fracture surface to face a data acquisition unit using a transport device;
- acquiring two-dimensional data and three-dimensional data on the first fracture surface;
- transporting the second fracture surface to face the data acquisition unit using the transport device;
- acquiring two-dimensional data and three-dimensional data on the second fracture surface;
- a contour extraction step of extracting, from the two-dimensional data, a first contour of the first fracture surface and a second contour of the second fracture surface;
- a transformation amount calculation step of calculating a transformation amount when the second contour is affine-transformed to the first contour,
- a distortion correction step of calculating distortion correction data by affine-transforming the three-dimensional data on the second fracture surface with the transformation amount;
- a comparison step of comparing the three-dimensional data on the first fracture surface and the distortion correction data; and
- outputting a loss evaluation determination as a function of the comparison of the three-dimensional data on the first fracture surface and the distortion correction data in the comparison step.

9. The fracture surface inspection method according to claim 8, wherein the two-dimensional data and the three-dimensional data on the first fracture surface are acquired at the same position and at the same angle, and wherein the two-dimensional data and the three-dimensional data on the second fracture surface are acquired at the same position and at the same angle.

10. The fracture surface inspection method according to claim 8, further comprising:
- a plane calculation step of calculating, from the three-dimensional data, a first least square plane of the first fracture surface and a second least square plane of the second fracture surface; and
- a correction amount calculation step of calculating a correction amount when the first least square plane is transformed to the second least square plane,
- wherein in the comparison step, the three-dimensional data on the first fracture surface and the distortion correction data corrected by the correction amount are compared.

11. The fracture surface inspection method according to claim 8, further comprising an undulation determination step of comparing, with a predetermined error threshold value, a least square error with respect to the least square plane of at least one of the first fracture surface and the second fracture surface.

12. The fracture surface inspection method according to claim 8, wherein the component includes a rod part and a cap part, wherein the first fracture surface is located on the rod part, and wherein the second fracture surface is located on the cap part.

13. The fracture surface inspection method according to claim 8, wherein the steps of acquiring two-dimensional data and three-dimensional data on the first fracture surface and acquiring two-dimensional data and three-dimensional data on and the second fracture surface are performed at the same time in parallel.

14. A fracture surface inspection device for inspecting a first fracture surface and a second fracture surface that are generated through fracture splitting of a component, comprising:
- a data acquisition unit configured to acquire two-dimensional data and three-dimensional data on the first fracture surface and the second fracture surface, wherein the data acquisition unit includes an imaging device configured to acquire images and at least one of (a) a projector configured to project alight pattern at an inspection target with the imaging device arranged to acquire images of the inspection target to acquire two-dimensional data and three-dimensional data on the first fracture surface and the second fracture surface, or (b) a non-contact surface measurement device configured to acquire three-dimensional data on the first fracture surface and the second fracture surface using a laser and with the imaging device configured to acquire two-dimensional data on the first fracture surface and the second fracture surface with the acquired images;
- a transport device, wherein the transport device is configured to transport the first fracture surface to face the data acquisition unit to acquire the two-dimensional data and the three-dimensional data on the first fracture surface, and wherein the transport device is further configured to transport the second fracture surface to face the data acquisition unit to acquire the two-dimensional data and the three-dimensional data on the second fracture surface;
- one or more computer processors collectively programmed to:
  - extract, from the two-dimensional data, a first contour of the first fracture surface and a second contour of the second fracture surface;
  - calculate a transformation amount when the second contour is affine-transformed to the first contour;
  - calculate distortion correction data by affine-transforming the three-dimensional data on the second fracture surface with the transformation amount;
  - compare the three-dimensional data on the first fracture surface and the distortion correction data; and
  - output a loss evaluation determination as a function of the comparison of the three-dimensional data on the first fracture surface and the distortion correction data.

15. The fracture surface inspection device according to claim 14, wherein the data acquisition unit acquires the two-dimensional data and the three-dimensional data at the same position and at the same angle on the first fracture surface and on the second fracture surface, respectively.

16. The fracture surface inspection device according to claim 14, the one or more computer processors further collectively programmed to:
 calculate, from the three-dimensional data, a first least square plane of the first fracture surface and a second least square plane of the second fracture surface; and
 calculate a correction amount when the first least square plane is transformed to the second least square plane,
 wherein the programmed comparison of the three-dimensional data on the first fracture surface and the distortion correction data compares the three-dimensional data on the first fracture surface and the distortion correction data corrected by the correction amount.

17. The fracture surface inspection device according to claim 14, the one or more computer processors further collectively programmed to compare, with a predetermined error threshold value, a least square error with respect to the least square plane of at least one of the first fracture surface and the second fracture surface.

18. The fracture surface inspection device according to claim 14, further comprising:
 a transport device, wherein the transport device is arranged to position the first fracture surface and the second fracture surface relative to the data acquisition unit.

19. The fracture surface inspection device according to claim 14, wherein the component is a connecting rod for connecting a piston with a crankshaft, wherein the first fracture surface is located on a rod part of the connecting rod, and wherein the second fracture surface is located on a cap part of the connecting rod.

* * * * *